(12) United States Patent
Shen et al.

(10) Patent No.: US 9,001,267 B2
(45) Date of Patent: Apr. 7, 2015

(54) METHOD AND APPARATUS FOR TIGHTLY COUPLED, LOW POWER IMAGE PROCESSING

(75) Inventors: Jian Shen, San Diego, CA (US); Lew G. Chua-Eoan, San Diego, CA (US); Yi-Pin Hsiao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 13/294,681

(22) Filed: Nov. 11, 2011

(65) Prior Publication Data

US 2013/0120593 A1  May 16, 2013

(51) Int. Cl.
*H04N 5/225* (2006.01)
*H04N 5/335* (2011.01)
*G06T 1/20* (2006.01)
*H04N 1/21* (2006.01)
*H04N 5/345* (2011.01)
*H04N 5/77* (2006.01)
*G06F 13/00* (2006.01)
*H04N 19/423* (2014.01)

(52) U.S. Cl.
CPC *H04N 5/335* (2013.01); *G06T 1/20* (2013.01); *H04N 1/2112* (2013.01); *H04N 5/3454* (2013.01); *H04N 5/772* (2013.01); *G06F 13/00* (2013.01); *H04N 19/00484* (2013.01)

(58) Field of Classification Search
USPC .............................................. 348/222.1, 374
See application file for complete search history.

(56) References Cited

U.S. PATENT DOCUMENTS

| | | | |
|---|---|---|---|
| 5,046,080 A | 9/1991 | Lee et al. | |
| 6,995,794 B2 | 2/2006 | Hsu et al. | |
| 7,483,058 B1 * | 1/2009 | Frank et al. | 348/222.1 |
| 2006/0018552 A1 | 1/2006 | Malayath et al. | |
| 2007/0008325 A1 | 1/2007 | Rai et al. | |
| 2007/0041371 A1 * | 2/2007 | Hattori | 370/352 |
| 2008/0019250 A1 | 1/2008 | Ando et al. | |
| 2011/0193961 A1 * | 8/2011 | Peterson | 348/148 |
| 2011/0211726 A1 * | 9/2011 | Moed et al. | 382/100 |

FOREIGN PATENT DOCUMENTS

| | | |
|---|---|---|
| DE | 19615571 A1 | 10/1996 |
| EP | 0306305 A2 | 3/1989 |
| EP | 1558031 A1 | 7/2005 |
| KR | 100251457 B1 | 4/2000 |

OTHER PUBLICATIONS

International Search Report and Written Opinion—PCT/US2012/064730—ISA/EPO—Apr. 17, 2013.

(Continued)

*Primary Examiner* — Gevell Selby
(74) *Attorney, Agent, or Firm* — Donald D. Min

(57) ABSTRACT

An image divided into N pixel blocks, stored block wise in a camera core and transferred block wise from the camera core to a downstream processing engine local to the local memory. A direct handshaking is communicated, between the camera core and the downstream processing engine, in the block wise transfers. Optionally an optical sensor scanner divides the image with a scan rate N times a frame rate, each scan providing a block of the frame. Optionally, the block wise transfer includes a transfer through a local memory, local to the camera core, controlled by the direct handshaking.

43 Claims, 4 Drawing Sheets

(56) References Cited

OTHER PUBLICATIONS

Okada, S., et al., "System-On-A-Chip for Digital Still Cameras With VGA-Size Video Clip Shooting", IEEE Transactions on Consumer Electronics, IEEE Service Center, New York, NY, US, vol. 46, No. 3, Aug. 1, 2000, pp. 622-627, XP001142887, ISSN: 0098-3063, DOI: 10.1109/30.883422.
Partial International Search Report—PCT/US2012/064730—ISA/EPO—Jan. 23, 2013.

* cited by examiner

METHOD AND APPARATUS FOR TIGHTLY COUPLED, LOW POWER IMAGE PROCESSING

FIELD OF DISCLOSURE

The technical field of the disclosure relates to video data communication and processing.

BACKGROUND

Certain video systems have an optical sensor that transfers video frames to a camera core within a video circuit having a video coder/decoder (VCODEC) and a local memory. The video frames must pass from the camera core and eventually reach the VCODEC for coding and subsequent processing. However, the camera core cannot directly hand off the video frames to the VCODEC because the camera core and local memory lack sufficient storage capacity to function as a video frame buffer. The camera core also generally lacks required handshaking functions for passing video frames to the VCODEC. The video circuit therefore offloads entire video frames from the camera core to an external memory, then retrieves these offloaded video frames from the external memory and inputs the frames to the VCODEC. The offloading and retrieval of the video frames is generally controlled by an application processor. The external memory and the application processor, however, each consume considerable power.

Prior means and efforts to reduce, or offset, this power include placing the external memory and interfacing circuitry between the camera core and the external memory in closer proximity, as well as using higher burst length for the video frame transfers to increase bus efficiency. The prior means and efforts also include scaling of the bus and core clock. The prior means and efforts, although reducing power consumption, do not remove the power consumption by the external memory or by the application processor.

SUMMARY

This summary is not an overview of all contemplated aspects, or to delineate the scope of any embodiment or any aspect thereof. Its sole purpose is to present some example concepts all of which, among others, will be further understood from the more detailed description of various exemplary embodiments that is set forth at later sections of this disclosure.

According to one exemplary embodiment a method of image processing may include receiving an image at a camera core and then transferring the image, on a block basis, from the camera core to a downstream processing engine and, in one aspect, the transfer on a block basis may include communicating direct handshake signals between the camera core and the downstream processing engine.

In one aspect, communicating direct handshake signals between the camera core and the downstream processing engine may be over a direct handshaking path coupled to the camera core and to the downstream processing engine.

In one aspect, receiving the image at the camera core may include dividing an image at an optical sensor into a plurality of N blocks, and concurrently storing a quantity of the N blocks in at least one of the camera core and a local memory.

In one aspect, receiving the image at the camera core may include performing N scans of the image at an optical sensor, transferring, for each of the N scans, at least a block of the image to at least one of the camera core and a local memory associated with the camera core, and concurrently storing a quantity of the N blocks in at least one of the camera core and the local memory.

According to one exemplary embodiment a method of image processing may include scanning an optical sensor to obtain one scan of the image, extracting a block of a given N-block division of the one scan of the image, storing the extracted block in at least one of a camera core or a local memory associated with the camera core, transferring the one extracted block from at least one of the camera core or the local memory to a downstream processing engine, and repeating the scanning, extracting, storing, and transferring N times to provide the image to the processing engine.

In one aspect, transferring the one extracted block from at least one of the camera core or the local memory to a downstream processing engine includes communicating handshaking signals between the camera core and the downstream processing engine.

According to one exemplary embodiment, an image processor may include means for scanning an optical sensor to obtain one scan of the image, means for extracting a block of a given N-block division of the one scan of the image, means for storing the extracted block in at least one of a camera core or a local memory associated with the camera core, means for transferring the one extracted block from at least one of the camera core or the local memory to a downstream processing engine, with transferring the one extracted block from at least one of the camera core or the local memory to a downstream processing engine including communicating handshaking signals between the camera core and the downstream processing engine.

According to one exemplary embodiment, an image processor may include a camera core, a downstream processor coupled over a data interconnect to the camera core; and a direct handshaking path coupled to the camera core and to the downstream processor and, in one aspect, the camera core may be configured to receive a given video frame and to transfer the video frame as N pixel blocks to the downstream processor, and control the transfer of each pixel block through the direct handshaking path.

According to one exemplary embodiment, a computer program product can include a computer-readable medium comprising code for causing at least one computer to scan an optical sensor to obtain one scan of the image, code for causing at least one computer to extract a block of a given N-block division of the one scan of the image, code for causing at least one computer to store the extracted block in at least one of a camera core of a local memory associated with the camera core, code for causing at least one computer to transfer the one extracted block from at least one of the camera core or the local memory to a downstream processing engine, and code for causing at least one computer to repeat the scanning, extracting, storing, and transferring N times to provide the image to the processing engine.

According to one exemplary embodiment, an image processor may include a camera core having means for receiving an image and means for storing at least a portion of the received image, and means for transferring the image on a block basis from the camera core to a downstream processing engine, wherein the transferring includes communicating of handshaking signals between the camera core and the downstream processing engine.

BRIEF DESCRIPTION OF THE DRAWINGS

The accompanying drawings found in the attachments are presented to aid in the description of embodiments of the invention and are provided solely for illustration of the embodiments and not limitation thereof.

FIG. 1 shows one example related art video flow and video system.

DETAILED DESCRIPTION

Figure 1:
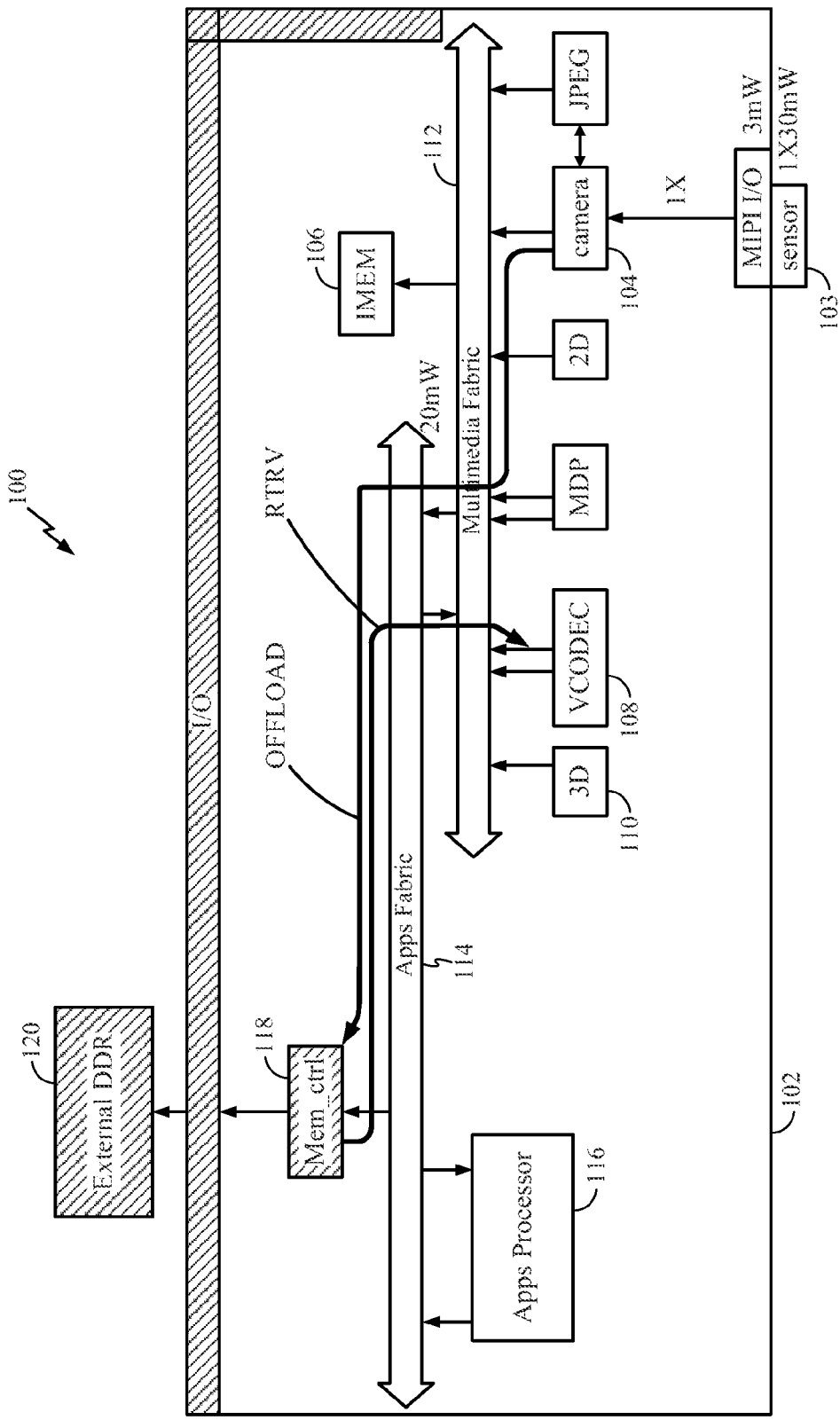

Aspects of the invention are disclosed in the following description and related drawings of specific illustrative embodiments according to the invention. It will be understood that these specific illustrative embodiments are only purposes of assisting persons of ordinary skill in the art in further understanding the various concepts, and for practicing the invention in any of the various or alternative embodiments that may become apparent to such persons from this disclosure.

The terminology used herein is for the purpose of describing particular embodiments only and is not intended to be limiting of the scope of the embodiments of the invention, or of any aspect thereof. Further regarding terminology, the word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

On addition, the singular forms "a", "an" and "the" are intended to include the plural forms as well, unless the context clearly indicates otherwise. It will be further understood that the terms "comprises," "comprising," "includes," and/or "including", when used herein, specify the presence of stated features, integers, steps, operations, elements, and/or components, but do not preclude the presence or addition of one or more other features, integers, steps, operations, elements, components, and/or groups thereof.

Further, certain embodiments are described in terms of sequences of actions that may be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause a computer or an associated processor to perform the functionality described herein. Thus, the various aspects of the invention may be embodied in a number of different forms, all of which have been contemplated to be within the scope of the appended claims. In addition, for each of the embodiments described herein, the corresponding form of any such embodiments may be described herein as, for example, "logic configured to" perform the described action.

Persons of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields, electron spins particles, electrospins, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps are described generally in terms of their functionality. As persons of ordinary skill in the art will appreciate, whether such functionality is implemented as hardware or software, or a combination, depends upon the particular application and design constraints imposed on the overall system. Such persons may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, various embodiments of the invention may include, or may be practiced using, a computer readable media embodying instructions causing the computer to perform, or to control other structures to perform, a process according to the embodiment. Accordingly, the invention is not limited to illustrated examples and any means for performing the functionality described herein are included in embodiments of the invention.

Related Art FIG. 1 shows a conventional video system 100 having a conventional video circuit 102 that interfaces an optical sensor 103, and that has a camera core 104, a local memory 106, a video coder/decoder (VCODEC) 108 and 3D processor 110 interconnected by a multimedia fabric 112. The conventional video circuit 102 also has an application (or "apps") fabric 114 that connects to the multimedia fabric 112 and interconnects an application processor 116 and an external memory controller 118. The external memory controller 118 interfaces with an external memory 120 (e.g., external DDR), and controls offloading of data to and retrieval of data from the external memory 120, as described below in greater detail.

Continuing to refer to FIG. 1, in the conventional video system 100 the external optical sensor 103 can be an M row by N column pixel array (not separately shown) of optical pixel sensors. In an operation of the conventional video system 100, optical sensor 103 performs a succession of raster scans, each raster scan generating an M by N pixel frame (alternatively referenced hereinafter as a "raw video frame"). The raster scan rate may be FS raster scans per minute, which generates raw video frames at a frame rate of FS frames per minute. The conventional video circuit 102 inputs the raw video frames, received from the optical sensor 103 at the frame rate FS, to the camera core 104. The camera core 104 then performs simple formatting functions on each frame, such as crop and block and brightness, to generate what will be termed for this description as "formatted raw frames." More substantive, higher computational burden operations, for example video compression or 3D processing, are performed by downstream processors such as the decoder VCODEC 108 and/or 3D processor 110.

With continuing reference to FIG. 1, due to its limited memory space the camera core 104 cannot hold substantially more than one frame. Also, as has been long known, the architecture of the camera core 104, the multimedia fabric 112, and the downstream processors (e.g., the VCODEC 108 or 3D processor 110), make it impracticable for the camera core 104 to directly transfer the formatted raw frames to these downstream processors at a rate sufficient to keep up with frame rates FS used in many applications.

The known solution to the above-described limitation of conventional video systems such as shown in FIG. 1 is for a processor resource, such as the example application processor 116 and memory controller 118, to perform an offloading of the formatted raw frames to an external memory, such as the example external memory 120, as is depicted by the data flow OFFLOAD followed, as depicted by the data flow RTRV, with a controlled retrieval of the formatted raw frames from that external memory, and ordered input of these frames to a selected downstream processor, e.g., the VCODEC 108 internal to the conventional video circuit 102. The OFFLOAD, as shown in FIG. 1, can be from the data camera core 104 through the multimedia fabric 112, through the apps fabric 114 and the memory controller 118 to the external memory 120. The RTRV can be substantially a reverse, namely from the external memory 120, through the external memory controller 118, through the apps fabric 114 and multimedia fabric 112 to the VCODEC 108. As stated above, the application processor 116 controls the retrieval and the data flow RTRV to provide the formatted raw frame data as an ordered input to the VCODEC 108 (or to another selected downstream processor, for example the 3D processor 110), the order being particular to that VCODEC 108 or other downstream processor, and to the specific operation it is performing. The control performed by the application processor 116 can include communicating the handshaking signals required by the VCODEC 108 or other downstream processor.

This above-described known offloading and retrieval solution to the limited storage of the camera core 104, and to the limited transfer capability between the camera core 104 and the downstream processors (e.g., the VCODEC 108), however, consumes considerable power. Contributors to this considerable power consumption include, for example, the application processor 116 as well as the external memory controller 118 and, further, the external memory 120. Additionally, power is consumed by the external memory 120.

As will be understood from this disclosure, exemplary embodiments provide, among various features and benefits, elimination of these above-described offloading and retrieving operations, and therefore elimination of the above-described power consumption by for example, the application processor 116 in performing these operations. Further, as will appreciated from this disclosure by persons of ordinary skill in the art, the exemplary embodiments provide these and other features and benefits without requiring any substantive increase in memory internal to the video circuit 102.

Regarding terminology used in this description, the terms "downstream processor" and "downstream processing engine" are used interchangeably, which means that either may be substituted for the other without change of the intended meaning.

Further regarding terminology used in this description, it will be understood that hereinafter, except in instances where it is explicitly stated as having, or made clear from the context to have a different meaning, the term "VCODEC" means: "VCODEC or other downstream processor, for example but not limited to a 3D processor". It will be similarly understood that hereinafter, except in instances where explicitly stated as having, or made clear from the context to have a different meaning, the terms "downstream processor" and "downstream processing engine," where standing alone without a context reciting "VCODEC," "3D" or other specific image processing function, means: "downstream processor, such as but not limited to a VCODEC, 3D processor, or any other image processor dedicated, or configurable for performing image processing."

In addition, it will be understood that hereinafter, except in instances where explicitly stated otherwise or made clear from the context to have a different meaning, the terms "video" and "image" will be interchangeable, which means that either may be substituted for the other without change of the intended meaning.

It will also be understood that hereinafter, except in instances where explicitly stated otherwise or made clear from the context to have a different meaning, the terms "frame," "pixel frame," and "video frame" will be interchangeable, which means that any may be substituted for the other without change of the intended meaning.

In a video circuit or method according to one exemplary embodiment, a camera core, a local memory, and a downstream processor such as a VCODEC may be provided, interconnected by a multimedia path, for example, a multimedia bus, fabric or other data interconnect, and provided with a direct handshake path between the camera core and the VCODEC. In one aspect the camera core may be configured to communicate (e.g., generate, transmit and receive), over the direct handshake path, a handshaking signal to effectuate and control a transfer of an image on a block basis (alternatively referenced herein as a "block wise" transfer of images) from the camera core to the VCODEC. Further to this aspect, the camera core may be configured to perform the block wise transfer of images to the VCODEC over the multimedia path while communicating, over the direct handshake path to the VCODEC, the necessary handshaking signals for the VCODEC to receive and process the image data.

In one aspect, an optical sensor having an X row by Y column array of optical detector pixels interfaces with the video circuit according to the exemplary embodiments. In one aspect the optical sensor may be configured to perform a raster scan of its X row by Y column array of optical detector pixels at a rate that is multiple times, for example an integer N, above a nominal frame rate FS. In one further aspect each of these raster scans may send, instead of an entire frame having all X by Y pixels, only a block of the pixels. In one example according to this aspect, a crop and block feature may be provided in, or associated with the optical sensor such that each of the raster scans may output to the video circuit an image block having a crop and block result of 1/N of the pixels of the frame. As will be described in greater detail in reference to FIG. 3, each image block may correspond to a "tile" within the frame of X by Y pixels. In another example, the crop and block may be omitted from the optical sensor and, instead, included in a low complexity processing performed internal in the camera core.

As one illustration of aspects introduced above, in one practice according to one or more exemplary embodiments N may be set at an integer such as 16, and an optical sensor configured to perform a raster scan of its X by Y optical detector pixels at a rate 16 times a nominal frame rate FS. Assuming the example N of 16, a crop and block may be included in the optical sensor such that each of these raster scans outputs a different one of N blocks of the image (each block alternatively referenced as an "image block" or "tile"), with each image block or tile being X·Y/16 pixels. Therefore, if N=16 and assuming no overlap between the image blocks (which may be employed or may be omitted in practicing the exemplary embodiments) 16 raster scans by the optical sensor of its X by Y array of optical detector pixels will send, as a succession of 16 image blocks of image data, one frame of X by Y pixels to the camera core. It will be understood that N of 16 is only one example and, as will be will be appreciated by persons of ordinary skill in the art from this disclosure, actual values of N may be application specific, but can be readily determined by such persons based, for example, on characteristics (e.g., data buffer capacity) of the particular camera core and of the particular data path (e.g., a multimedia fabric) internal to the video circuit interconnecting the camera core and the VCODEC, as described in greater detail at later sections.

According to exemplary embodiments introduced above, and described in greater detail at later sections, a video circuit may be provided with a camera core and a VCODEC interconnected by, for example, a multimedia fabric or equivalent means and, in one aspect, the video circuit may further include a direct handshake path between the camera core and the VCODEC. Further to this aspect, the camera core may be configured to communicate, over the direct handshake path, handshaking signals required for transferring images to the VCODEC, and to transfer image data to the VCODEC over, for example, the multimedia path while communicating, over the direct handshake path, the handshaking signals required for the VCODEC to receive and process the image data.

In one aspect the camera core of a video circuit according to the exemplary embodiments may transfer image blocks of an X by Y pixel frame to a downstream processor using a small local memory, internal to a video circuit and, may utilize the handshaking path between the camera core and the VCODEC to control the transfer of the image blocks from the local memory to the VCODEC.

In one aspect a block wise transfer of an X by Y pixel frame may include an initial segmentation or dividing at the optical sensor of the X by Y pixel frame into N pixel blocks, which may include the optical sensor performing a raster scan at N times FS, where FS is a frame rate in frames per second and, at each raster scan, sending a different one of the N image blocks or tiles (each with X·Y/N pixels) into which each X by Y video frame is segmented or divided. This N times FS (or "N·FS") rate raster scanning feature may be combined with the embodiments' block wise transfer of the image blocks from the cameras core to the downstream image processor to provide, as will be understood from reading this disclosure, a flow of video frames from the optical sensor to the camera core at usable frame rates FS without the Related Art FIG. 1 offloading of the video frame to an external memory and retrieval from the external memory and, therefore, without the power consumption for such operations.

In one aspect the camera core may include a latency buffer or equivalent data storage, and may include means for detecting or monitoring a fill state of that latency buffer or other data storage. In one further aspect the camera core may be configured to generate and communicate its direct handshake signals with the downstream image processor, based on the detected fill state of the latency buffer, to indicate data availability (i.e., the latency buffer has sufficient image data from the optical sensor to start a block wise transfer) and to prevent overflow in the camera core's latency buffer. In a related aspect, additional or alternative to a latency buffer in the camera core, a video circuit according to the exemplary embodiments may have an internal local memory, such as the previously described local memory coupled by the internal multimedia fabric or equivalent to the camera core and the downstream video processor, provided with a latency buffer or equivalent data storage. Further to this related aspect, camera core may be configured to detect or monitor the fill state of the local memory's latency buffer, and to generate and communicate the direct handshake signal, at least in part, based on that detected or monitored fill state.

Figure 2:
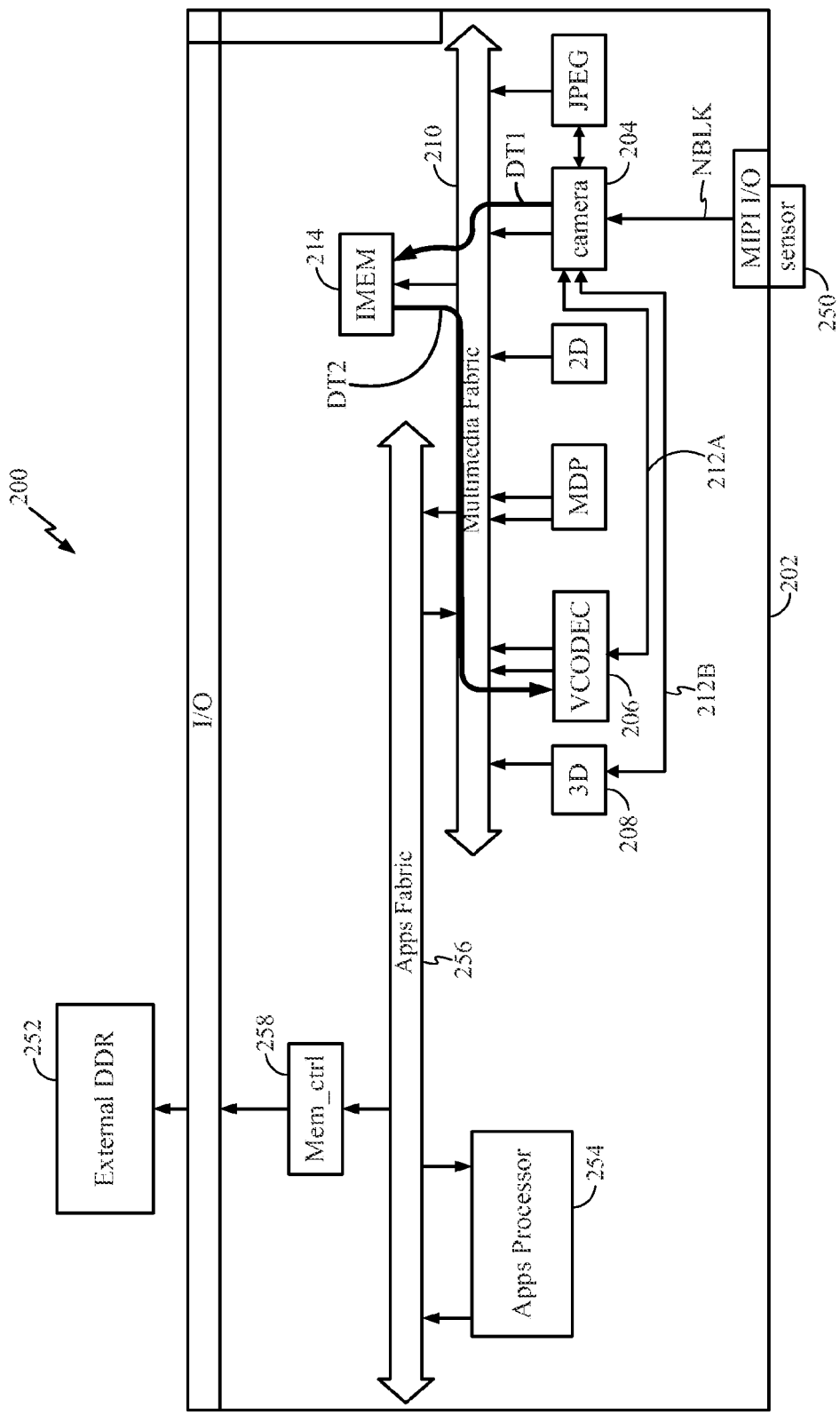
FIG. 2 is a functional block diagram of one video direct camera to downstream processor transfer system and one example direct video camera to downstream processor block transfer according to one exemplary embodiment.

FIG. 2 shows one example functional block diagram 200 of system having a video circuit 202 according to one exemplary embodiment, in an example environment in which the video circuit 202 interfaces an optical sensor 250. The optical sensor 250 may be, but is not necessarily, a conventional pixel array optical sensor having an Q row by R column array of optical detector pixels (not individually shown, and hereinafter referenced as "detector pixels"), with circuitry (not specifically shown) that scans the optical detector pixels at a programmable scan rate and outputs a corresponding data stream having a "start of scan" and "end of scan" format. It will be understood that the labels "Q" and "R" are simply arbitrary reference labels having no inherent meaning, and that any other reference labels, e.g., "X" and "Y," may be used in their place. Persons of ordinary skill in the art relating to the exemplary embodiments have knowledge of conventional pixel array optical sensor technologies, and/or have knowledge of conventional pixel array optical sensors and the various commercial vendors providing the same, to either design and construct or select and configure, in view of the present disclosure, a commercially available or other conventional technology pixel array optical sensor to practice according to the exemplary embodiments. Therefore, except for example scanning operations in relation to practices according to the exemplary embodiments, detailed description of the optical sensor 250 is omitted. The video circuit 202 may include a camera core 204 and downstream processors such as a video coder/decoder (VCODEC) 206 and 3D processor 208 interconnected by, for example, an internal multimedia fabric or bus 210. In accordance with one aspect, the video circuit 202 may include, or may be configured to form, a direct handshake path such as the example direct handshake paths 212A and 212B, between the camera core 204 and the one or more of the downstream processors, for example one or both of the VCODEC 206 and the 3D processor 208, to which a direct, block wise transfer of image data from the camera core 204 according to the exemplary embodiments may be desired. As will be understood, further to this aspect of direct handshake paths, e.g., 212A and 212B, providing control by the camera core 204 of block wise transfer to downstream processors within the video circuit 202, the direct handshake paths such as 212A and 212B may be dedicated.

With continuing reference to FIG. 2, it will be understood that except where explicitly stated otherwise or where made clear from the context to have a different meaning, the term "direct transfer of image data" from the camera core 204, as used herein, encompasses a transfer of image data controlled by or through the camera core 204 or equivalent that is through an internal path such as the internal multimedia fabric 210 or equivalent, without an offloading to an external memory such as the external memory 252, described further below (or the FIG. 1 external memory 120). It will also be understood that "an internal path such as the internal multimedia fabric 210 or equivalent" may encompass, according to one aspect, transfers from the camera core 204 or equivalent to a downstream processor, e.g., the VCODEC 206 and/or the 3D processor 208 that can pass through local memory, such as the "IMEM" 214 shown in the example video circuit 202. One example according to this aspect of a direct transfer of image data from a camera core to a downstream processor is shown on FIG. 2 as including a transfer DT1 from the camera core 204 to the IMEM 214 and a transfer DT2 from the IMEM 214 to the VCODEC 206, and is described in greater detail at later sections. Further to this aspect, in a direct transfer of image data from a camera core to a downstream processor such as the FIG. 2 transfer DT2 from the IMEM 214 to the VCODEC 206 or 3D processor 208, the image data may pass though the multimedia fabric 210 or equivalent with concurrent communication of handshaking signals between the camera core 204 and the VCODEC 206 or 3D processor 208 over the direct handshake signal path 212A or 212B.

Referring still to FIG. 2, with respect to the structure and protocol of the internal multimedia fabric 210, it will be understood that these are not necessarily particular to the embodiments. On the contrary, persons of ordinary skill in the pertinent art, applying the know-how such persons possess to this disclosure, can readily select from among conventional protocols and specifications of interconnects to configure a current standard internal multimedia fabric 210 or equivalent to practice according to the exemplary embodiments. Further detailed description of the particulars of the internal multimedia fabric 210 is therefore omitted. In addition, such persons can, in view of this disclosure, readily adapt fabrics, busses, and other interconnections that may be later developed, for interconnection of functional blocks such as the camera core 204 and VCODEC 206, to practice according to the exemplary embodiments. Also, it will be understood that the embodiments are not limited to interconnections of functional blocks (such as the camera core 204 and VCODEC 206) that are within the meaning of "bus" or "fabric."

Continuing to refer to FIG. 2, the video circuit 202 may include, but as will be understood from this disclosure may omit for practices according to the exemplary embodiments, an application processor 254 that may be connected, for example by an application fabric 256, to the internal multimedia fabric 210. The video circuit 202 in the example functional block diagram 200 is also shown as having a memory controller 258 and as interfacing with an external memory 252. The memory controller 258 and the external memory 252, though, or use of such devices, may be omitted for practices according to the exemplary embodiments. Further detailed description of the application processor 254, applications fabric 256, memory controller 258, and external memory 252 is therefore omitted.

According to one exemplary embodiment a system or method according to the FIG. 2 functional block diagram 200 may employ an optical sensor 250 having, in one aspect and as previously described, a Q×R array of detector pixels. In one aspect the optical sensor 250 may be configured to perform a raster scan of the Q×R detector pixels at an integer N multiple of a given frame rate FS. In one aspect the optical sensor 250 may include a "crop and block" or equivalent feature capable of scanning, at each of the raster scans, only a block, for example 1/N of its Q×R array of detector pixels. As will be described in greater detail in reference to FIG. 3, using such a crop and block or equivalent operation the optical sensor 250 may scan its Q×R array of detector pixels as a tessellated pattern of N tiles, each tile having QR/N pixels. As one illustration, to focus the description without unnecessary arithmetic complexity, an example optical sensor 250 may have a Q×R array of detector pixels, with Q and R having an example value of 1024 (or 1K), and N set at an example value of 16. Assuming the crop and block or equivalent is performed within the optical sensor 250 each raster scan will therefore generate, and send to the camera core 204, a block of 256×256 or 64K pixels. It will be understood that except for divisibility of these values, which is only for minimal arithmetic complexity in describing examples, these values of Q and R are arbitrary. The example value of N is arbitrary in part and, as will be understood by persons of ordinary skill in the art from this description, was selected to show 64K pixels as one example block size.

General methods and means for configuring a conventional Q×R optical sensor to perform the above-described crop and block or equivalent functions are generally known and, therefore, further detailed description is omitted. It will be understood that the present embodiments are not limited to performing the crop and block or equivalent function within the optical sensor 250. In another aspect, described in greater detail at later sections, the camera core 204 may be configured to receive entire frames from the optical sensor 250 and then transfer each of the frames, according to exemplary embodiments, in a block manner to the downstream processors as N blocks. Also according to this other aspect, and as will be described in greater detail at late sections, the camera core 204 may be configured with a latency buffer (not explicitly shown). Additionally the camera core 204 may be configured to manage the latency buffer to store new frame data from the optical sensor 250 in the space emptied by block transfers to the downstream processors. Further, based on the present disclosure, alternative means and methods for scanning or otherwise selecting or extracting only a block of 1/N of the Q×R optical sensors at each raster scan may become apparent to a person or ordinary skill in the art. As one illustration, a block selection buffer (not explicitly shown in the figures) may be included within the video circuit 202, for example between the camera core 204 and the interface (shown but not separately numbered) between the video circuit 202 and the optical sensor 250. Such a block selection buffer could, at each of the raster scans performed by the optical sensor 250, receive an entire Q by R frame of pixels (which using the above-described example values of Q and R would be a 1M pixel frame), transfer only one QR/N=1M/16=64K block of these pixels to the camera core 204 and discard the remainder. Persons of ordinary skill in the art, upon reading this disclosure, may readily select, design and/or configure circuitry implementing such means or methods for selecting or extracting blocks from the Q by R optical sensor, or equivalent, within the optical sensor 250.

Referring to FIG. 2 and continuing with description of example processes for methods and in systems according to the exemplary embodiments, using the identified example values Q=R=1024 and N=16 for illustration, in one example according to the FIG. 2 functional block diagram 200 an illustrative raster scan sequence may begin by scanning the 256×256 (64K) sub-block or sub-array of optical sensors (not separately shown) at an upper left of the example array of 1K by 1K optical sensors, and generating a corresponding 64K pixel block. The 64K pixel block may then be transferred to the camera core 204. FIG. 2 shows as NBLK an example of a pixel block transfer such as this 64K pixel block transfer. With respect to the specifics of the interface between the optical sensor 250 and the video circuit 202, and related specifics of the NBLK pixel block transfer to the camera core 204, as previously described the data output from the optical sensor 250 for each pixel scan may be according to general conventional raster scan output format. It will also be readily appreciated by persons of ordinary skill in the processing arts that the interface circuitry will be particular to the circuitry of the selected optical sensor 250 and to the circuitry selected to the camera core 204. From this disclosure, such persons can readily select, configure and/or design circuitry to perform such interface and block transfer operations for practicing according to the exemplary embodiments and, therefore, further detailed description of these functions is omitted.

Continuing further with describing one example operation on a system and in a process according to the exemplary embodiments, using the above-described example values of Q=R=1024 and N=16, in one aspect the camera core 204 may be configured with a latency buffer (not explicitly shown). For purposes of illustration an example will be assumed in which the camera core 204 has a latency buffer that can hold M of the pixel blocks generated at each raster scan of the optical sensor 250. With respect to the value of M, as will be readily understood by persons of ordinary skill in the art from this disclosure, that value may depend on the size of the pixel blocks, which in turn depends on the value of N, in conjunction with the values of Q and R. Subject to these conditions, it will be apparent that in some examples M may be equal to N, while in other examples M may be less than N and, further, M may even be greater than N. In other words, embodiments are contemplated in which the camera core 204 may be capable of holding only a portion of a frame, or may be capable of holding an entire frame of the image data from the optical sensor 250. In one aspect, the camera core 204 may be configured to detect the fill level of the latency buffer and, based at least in part on this detection, communicate the handshake signals over, for example, the direct handshake paths such as 212A or 212B to effectuate transfer of the stored pixel blocks to the downstream processor (e.g., the VCODEC 206 or 3D processor 208) at a rate that avoids over-flow of the latency buffer. With respect to specific structure of such a latency buffer in the camera core 204, and of the means for detecting its fill state, various structures and methods for general latency buffers and the detection of the fill state of such buffers are known to persons of ordinary skill in the processing arts pertaining to these embodiments. Such persons can therefore, upon reading this disclosure, readily apply this general know-how to select, configure and/or design circuitry to perform such buffering and detection functions to practice according to the exemplary embodiments and, therefore, further detailed description of such structure is omitted.

In addition to, or as one alternative to, the above-described aspect of a latency buffer in the camera core 204, in another aspect a local memory such as the IMEM 214 may be configured to have a latency buffer (not explicitly shown) that can hold, for example S, of the pixel blocks that are generated at each raster scan of the optical sensor 250. It will be understood that S, like M, may depend on the size of the pixel blocks, i.e., on N, Q and R. In one further aspect, the camera core 204 may be configured to detect, or otherwise monitor the fill level of such a latency buffer in the IMEM 214 and, based at least in part on such detection or monitoring, to communicate handshake signals over, for example, the direct handshake paths such as 212A or 212B and thereby effectuate transfer of the stored pixel blocks from the IMEM 214 to the downstream processor (e.g., the VCODEC 206 or 3D processor 208), at a rate that avoids over-flow of the IMEM 214 latency buffer. With respect to specific structure of such a latency buffer in the IMEM 214, and of the means for the camera core 204 to detect or monitor its fill state, as stated above various structures and methods for latency buffers and the detection of the fill state of such buffers, for the reasons previously described in reference to the latency buffer aspect of the camera core 204, detailed description of such structure is not necessary for persons of ordinary skill in the art, having view of this disclosure, to practice according to the exemplary embodiments and, therefore, is omitted.

Referring to FIG. 2, as previously described, in the example system according to the functional block diagram 200, using Q=R=1024 and N=16, a first raster scan within one illustrative N raster scan sequence may scan an upper left 256×256 block of the 1K by 1K optical sensor, generating a 64K pixel block that may be transferred as the NBLK to the camera core 204. In one example, either immediately or after a latency that may depend on a selected configuration and a particular state of the latency buffer (not explicitly shown in the figures) in the camera core 204, the camera core 204 may transfer this first 64K pixel block to the IMEM 214, in a transfer such as represented by DT1. Further, either at a time prior to the DT1 transfer or even overlapping the DT1 transfer, the optical sensor 250 may perform a second raster scan, sending another 64K block as another NBLK transfer to the camera core 204. The second raster scan within one illustrative N raster scan sequence may, for example, scan an upper 256×256 block of the array of 1K by 1K optical sensors immediately to the right of the first 256×256 block, to generate another, or second 64K pixel block. Again, either immediately or after a latency that may depend on the selected configuration and a particular state of the latency buffer in the camera core 204, the camera core 204 may transfer this second 64K pixel block to the IMEM 214, in another transfer such as represented by DT1

As will be further understood from the graphical depiction at FIG. 3 and relating description at later sections, in the instant example using Q=R=1024 and N=16, the 16 raster scans may be conceptualized as a higher level raster scan, but instead of scanning individual pixels scanning 4 rows of 4 tiles, each tile being a block of 64K pixels. Conceptualized as such, and viewing the array of Q by R optical sensor pixels of the optical sensor 250 in a left-right, upper-lower orientation, the first of the 16 raster scans may be of the tile at an upper left corner (previously described as the 64K block at the upper left corner), and the last of the 16 scans may be the tile (i.e., the 64K pixel block) at the lower right corner. It will also be understood that this order of the scanning performed by the optical sensor 250, namely starting at the upper left and ending at the lower right, is only one example, and is not intended as any limitation on the scope of any embodiment or any aspect of any embodiment. For example, the first raster scan may be of the QR/N pixel block at the lower right of the Q×R detector pixel array forming the optical sensor 250. As will be understood by persons of ordinary skill in the art, the previously described higher level, or tile scanning, may also be viewed as dividing the image into N blocks.

Referring still to the functional block diagram 200 of FIG. 2, and continuing with the example configuration using Q=R=1024 and N=16, at some during the above-described sequence of 16 raster scans and the corresponding 16 NBLK transfer and corresponding transfers DT1, the IMEM 214 may begin transferring the 64K blocks it received through the transfers DT1 to the desired downstream processor, e.g., the VCODEC 206. For purposes of showing an example it will be arbitrarily assumed that the desired downstream processor is the VCODEC 206. Examples of these transfers are shown on FIG. 2 as DT2 and, according to one aspect, these may be controlled by a direct handshaking signal communication between the camera core 204 and the VCODEC 206, namely the direct handshake path 212A. As previously described, according to one aspect the IMEM 214 may have a latency buffer (not explicitly shown in the figures), and may have means for detecting the fill state of its latency buffer and, in a related aspect, the camera core 204 may be configured to detect or otherwise monitor that state. Further to this aspect, using the example N of 16, a sequence of 16 transfers DT2 may be performed to effect a block wise transfer of the entire frame to the VCODEC 206. It will be understood that the time span required for the sequence of 16 transfers DT2 may overlap in part with, and may lag by a certain amount, the time span required for the sequence of 16 transfers DT1. It will also be understood that, depending on the particular configuration selected for the internal multimedia fabric 210, the transfers DT1 and DT2 may be interleaved, e.g., in a time division multiplexing, on the internal multimedia fabric 210.

Referring to FIG. 2, it will be understood that the transfers NBLK, the transfers DT1 and the transfers DT2 may be viewed or conceptualized as a pipeline having an average transfer rate of N times FR, because N of the transfers must be performed for every frame of Q by R pixels generated by the optical sensor 250. It will also be readily understood by persons of ordinary skill in the art that the camera core 204 and the IMEM 214 and, if included, the latency buffer(s) of these circuits, may be configured to have an elasticity in the lag or latency between the 16 (or other N) raster scans generating the 16 pixel blocks transferred as NBLK, the 16 (or other N) DT1 transfers from the camera core 204 to the IMEM 214, and the 16 (or other N) DT2 transfers from the IMEM 214 to the downstream processor (e.g., the VCODEC 206). Persons of ordinary skill in the art, having basic know how of packet buffer management possessed by such persons can, based on this disclosure, readily apply such general know-how to select, configure and/or design circuitry in the camera core 204 and the IMEM 214 to provide such elasticity and, therefore, further detailed description of these functions is omitted.

Referring again to FIG. 2, in another aspect the camera core 204 may be configured to receive raw frame data from the optical sensor 250 as complete raster scans, each being an entire Q by R pixel frame. According to this aspect, the transfers NBLK are at the frame rate FS, as opposed to N times FS. Further to this aspect, the camera core 204 may be configured to store the raw frame data in a one frame or larger capacity latency buffer (not explicitly shown in the figures) and then perform the N transfers DT1, at the rate N times FS, with a latency such that a space vacated in the latency buffer by each transfer DT1 becomes available for receiving that amount of pixel data from a next frame, as a transfer NBLK from the optical sensor 250. With respect to specific structure(s) for a latency buffer in the camera core 204 to store new frame data from the optical sensor 250, including storing in space(s) made available from the transfers DT1, various structures and methods for general latency buffering are known to persons of ordinary skill in the arts pertaining to these embodiments, and such persons having view of this disclosure can readily select and configure such structure and methods to implement a latency buffering to practice such aspects according to the exemplary embodiments.

Figure 3:
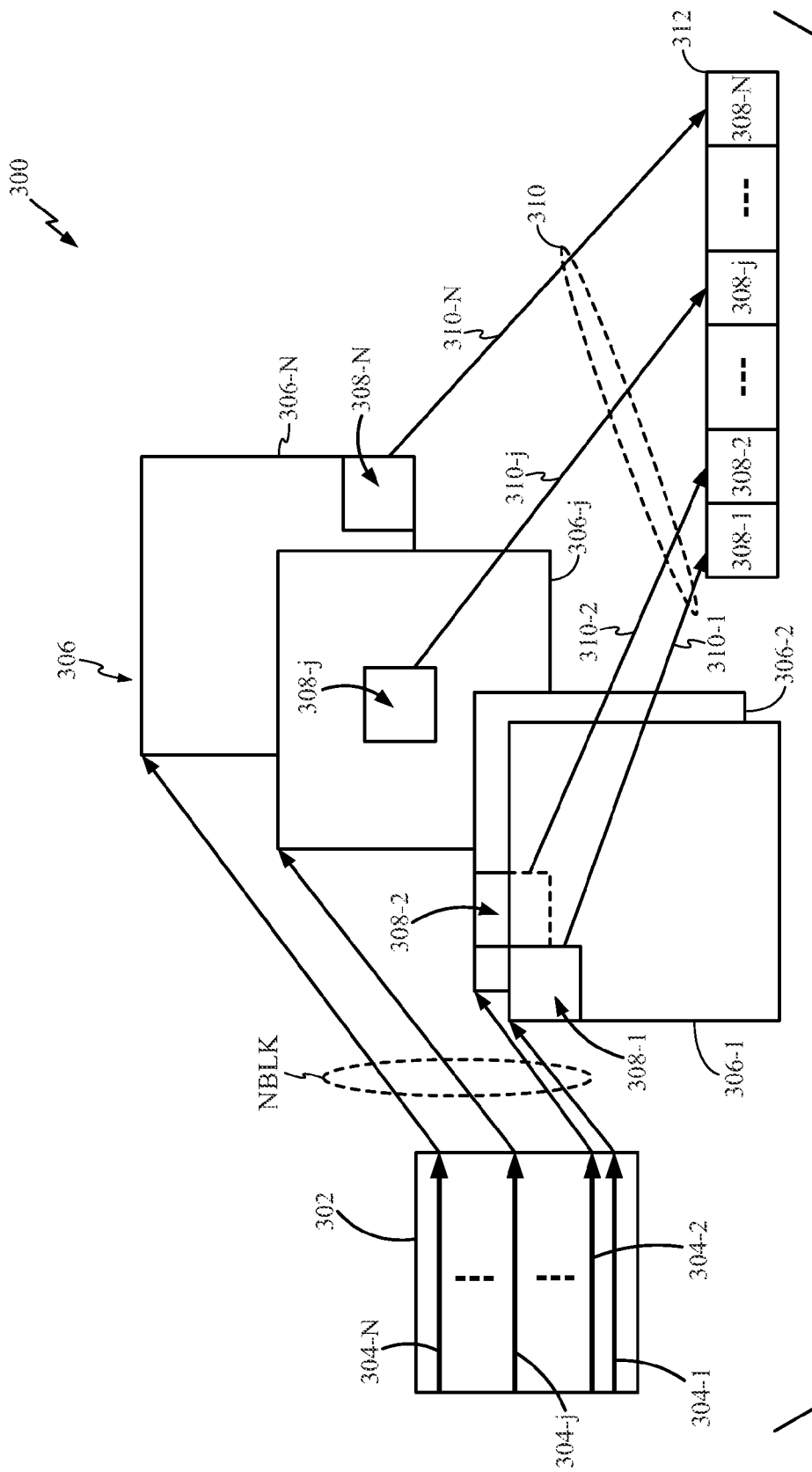
FIG. 3 is a flow diagram of one example of dividing a video frame into N pixel blocks and a corresponding direct camera to downstream processor transfer of pixel blocks according to various exemplary embodiments.

FIG. 3 is a flow diagram 300 of one example process for methods and in systems according to the exemplary embodiments. To illustrate particular aspects of the flow diagram 300, certain examples will be described in reference to the FIG. 2 functional block diagram 200. However, it will be understood that this is only to show concepts through particular examples and is not intended to limit the scope of any embodiment or of any aspect of any embodiment.

Referring to FIG. 3, frames 302 represents one complete Q by R frame, for example all of the Q×R pixel detectors from the optical sensor 250. Scan lines 304-1, 304-2 . . . 304-j . . . 304-N (collectively referenced as "scans 304") each represent one of the N scans of the optical sensor 250 that, in one aspect, are performed for each frame 302. Each of the scans 304 outputs what will be termed a "scan frame" 306 and, therefore, one Q by R frame, or image, may be considered as a succession or sequence of N scan frames. Referring to FIGS. 2 and 3, a data from each scan frame 306 can be carried by a corresponding one transfer NBLK shown in FIG. 2. FIG. 3 shows this as each scan frame 306 comprising a pixel block such as pixel block 308-1 within scan frame 306-1, representing the particular one of the N pixel blocks obtained at that scan. As will be appreciated by persons of ordinary skill in the art reading this disclosure, a pixel block such as the pixel block 308-1 may alternatively be labeled an "image block."

In aspects in which the optical sensor 250 performs the crop and block selection or extraction of the pixel blocks, the scan frame 306 may include only the pixel block 308. For example, in these aspects the NBLK corresponding to scan frame 306-1 consists only of the pixel block 308-1. Likewise, the NBLK corresponding to scan frame 306-2 would consist only of the pixel block 308-2, the NBLK corresponding to scan frame 306-j would include only the pixel block 308-j, and the Nth NBLK corresponding to scan frame 306-N would consist only of the pixel block 308-N. In the above-described example using Q=R=1024 and N=16, each of the scan frames 306-1 . . . 306-N would therefore have only the 64K of the pixel block 308-1 . . . 308-N (collectively referenced as "pixel blocks 308").

Referring still to FIG. 3, in contrast, in aspects in which the camera core 204 or equivalent performs the crop and block selection or extraction of the pixel blocks on the scan frames 306, each of the scan frames 306 may be Q×R pixels. The pixel blocks 308, in reference to these aspects, represents the crop and block selection or extraction performed in the camera core 204 or equivalent. In the FIG. 3 example flow 300 the scan frame 306-1, corresponding to the first raster scan 304-1, has a pixel block 308-1 at its upper left. As previously described this may be conceptualized as a tile at the upper left of the Q by R array of optical sensors within the optical sensor 250. As shown in FIG. 3, one example order in which the successive scan frames 306 may obtain the pixel blocks 308 produces a left to right "scan" of tiles, starting with at the "left" of a "top" row of tiles, ending at the "right" of the "top" row, moving down one row, repeating the "left" to "right" order, until ending at a "lower right" tile. The FIG. 3 flow 300 shows additional snapshots of this example order as the pixel block 308-j of scan frame 306-j being at a middle or central region of the frame 302, and pixel block 308-N of scan frame 306-N being at a lower right of the frame 302. It will be understood that these example directions and orientations of "left," "right," "upper," "lower," "top" and "bottom" are relative, and do not necessarily correspond to any actual position or orientation of pixel within the frame 302.

It will be understood that the above example order, where "order" means the progression in the location of the pixel block within the frame 302, in which the scan frames 306 extract the pixel blocks 308 is only one example, and is not intended as any limit on the scope of any embodiment or on the scope of any aspect of any of the embodiments. For example, in one contemplated alternative, the second scan frame 306-2 may extract a pixel block 308-2 that, instead of being horizontally adjacent the pixel block 308-1, may be vertically displaced or diagonally displaced from the pixel block 308-1. As will be understood from this disclosure by persons of ordinary skill in the arts, the order of the N pixel blocks 308 may depend part on the particular coding scheme used by, for example, the VCODEC 206. It will also be understood by such persons that it may be preferable to choose the order in which the scan frames 306 extract the pixel blocks 308 to correspond to the order in which the N pixel blocks are required by the downstream processor (e.g., the FIG. 2 VCODEC 206 or the 3D processor 208). For example, as readily understood by such persons from this disclosure, a selection or extraction order for the pixel blocks 308 that does not correspond to the order required by the downstream processor may necessitate storing, for example in the camera core 204 or the IMEM 214, a larger number of the N pixel blocks 308 than would be needed if the selection or extraction order did correspond to the downstream processor order.

Referring still to FIG. 3, block transfers 310 (e.g., 310-1 to 310-N, as illustrated) each represent a block transfer of a pixel block 308 (e.g., 310-j in relation to 308-j) from the FIG. 2 camera core 204 or equivalent to an input 312 of a downstream processor such as the FIG. 2 VCODEC 206 or 3D processor 208. In one aspect, each block transfer 310 may include a DT1 transfer of a pixel block 308 from the camera core 204 to a local memory such as the IMEM 214, followed by a corresponding DT2 transfer of the same pixel block from the IMEM 214 or equivalent to the downstream processor. Further to this one aspect, each block transfer 310 may include the cameras core 204, or equivalent, communicating direct handshake signals with the VCODEC 206 or other downstream processor to perform the DT2 or equivalent transfers. Still further to the one aspect, each block transfer 310 may include the camera core 204, or equivalent, detecting or otherwise monitoring a fill date of latency buffers (not explicitly shown in the figures) within the camera core 204 or IMEM 214, and using this detecting and/or monitoring to control the DT1 and/or DT2 transfers.

Figure 4:
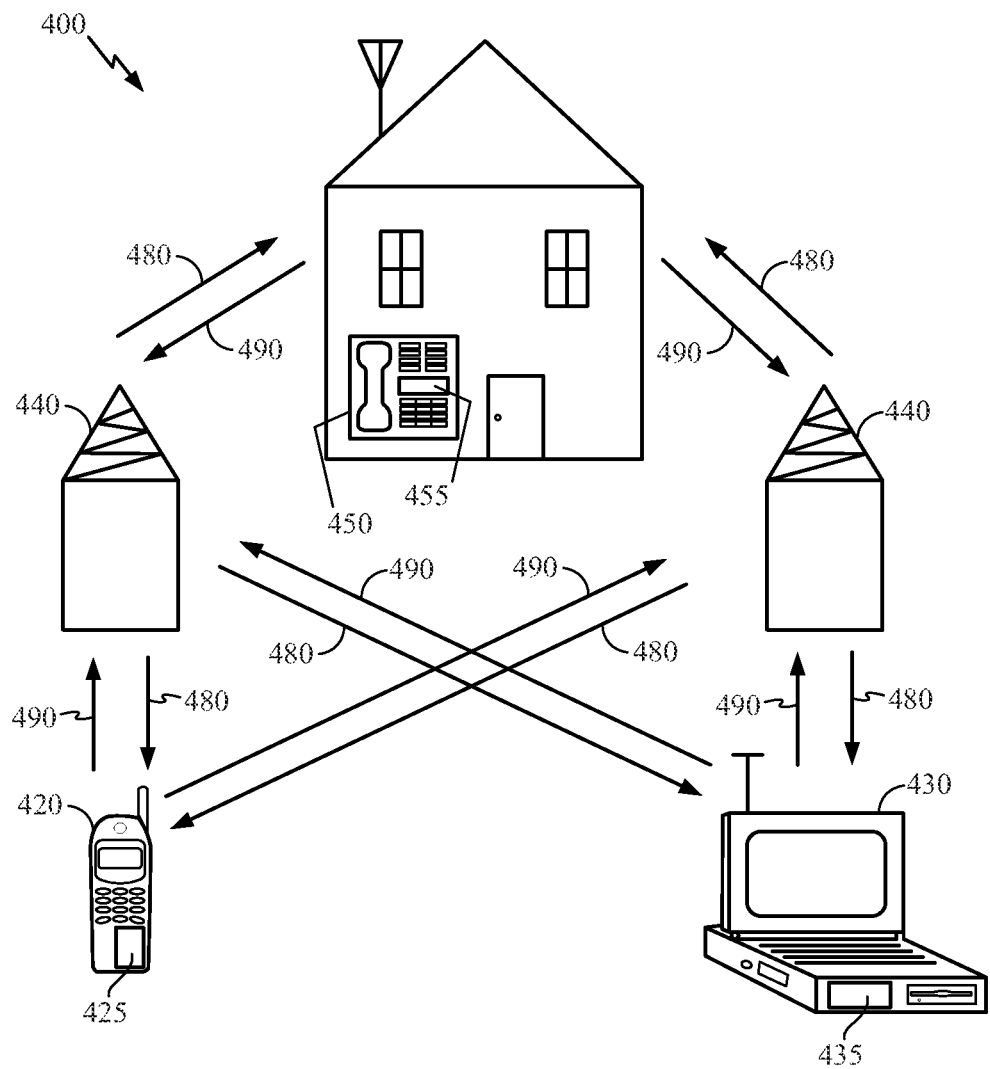
FIG. 4 shows a functional block diagram of one example personal computing device according to one exemplary embodiment.

FIG. 4 illustrates an exemplary wireless communication system 400 in which one or more embodiments of the disclosure may be advantageously employed. For purposes of illustration, FIG. 4 shows three remote units 420, 430, and 450 and two base stations 440. It will be recognized that conventional wireless communication systems may have many more remote units and base stations. The remote units 420, 430, and 450 include semiconductor devices 425, 435 and 455 which are among embodiments of the disclosure as discussed further below. FIG. 4 shows forward link signals 480 from the base stations 440 and the remote units 420, 430, and 450 and reverse link signals 490 from the remote units 420, 430, and 450 to the base stations 440.

In FIG. 4, the remote unit 420 is shown as a mobile telephone, the remote unit 430 is shown as a portable computer, and the remote unit 450 is shown as a fixed location remote unit in a wireless local loop system. The remote units may be, for example, any of a mobile phone, hand-held personal communication system (PCS) units portable data unit such as a personal data assistant, navigation device (such as a GPS enabled device), set top box, music player, video player, entertainment unit, fixed location data unit such as meter reading equipment, or any other device that stores or retrieves data or computer instructions, or any combination thereof. Although FIG. 4 illustrates remote units according to the teachings of the disclosure, the disclosure is not limited to these exemplary illustrated units. The disclosed device may be suitably employed in any device which includes a semiconductor device with an on-chip voltage regulator.

As will be appreciated by persons of ordinary skill in the art, features and advantages of the embodiments include, among others, lower power by reducing traffic through interconnects, and reduced access to external I/O and, further, lower power consumption by external memory. Addition features and advantages include, but are not limited to, improved system concurrency by reducing bus traffic and, by removing the offloading to external memory, a reduction in latency for downstream processing such as that performed by the FIG. 2 VCODEC 206 or 3D processor 208. Another example feature is that the above-described benefits of lower power and lower latency are obtained using only a small local memory internal to the video circuit, e.g., the IMEM 214, which can be, for example, in the range of hundreds of kilobytes, compared to a conventional frame buffer, e.g., the external memory 120 of shown in the Related Art FIG. 1, which can be at least several megabytes. Yet another example feature and benefit is that, through the exemplary embodiments having, in various combinations and arrangements, a direct handshake path between a camera core and a downstream processor, overflow can be prevented in the local memory, and in the latency buffer in the camera, notwithstanding these having a small capacity.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of processing an image, comprising:
receiving the image at a camera core; and
transferring the image on a block basis from the camera core to a downstream processing engine, wherein the transferring includes
    sending the image from the camera core over a local interconnect to a local memory coupled to the local interconnect,
    transferring the image from the local memory, over the local interconnect, to the downstream processing engine, and
    in association with transferring the image from the local memory, over the local interconnect, to the downstream processing engine, communicating a handshaking signal between the camera core and the downstream processing engine,
    wherein the communicating a handshaking signal between the camera core and the downstream processing engine is over a direct handshaking path outside of the local interconnect and coupled to the camera core and to the downstream processing engine.

2. The method of claim 1, wherein the transferring transfers the image as N image blocks, wherein N is at least two, over a local interconnect coupled to the camera core and to the downstream processing engine.

3. The method of claim 1, further comprising an image processing at the downstream processing engine according to a given order, wherein the transferring transfers the image as a sequence of image blocks according to the given order.

4. The method of claim 1, wherein the downstream processing engine is video coder/decoder (VCODEC), graphics processing unit (GPU) or display.

5. The method of claim 1, wherein the transferring the image over the local interconnect to the downstream processing engine includes transferring the image in blocks.

6. The method of claim 1, wherein the transferring the image over the local interconnect from the local memory to the downstream processing engine over the local interconnect includes transforming the image in N blocks, wherein N is at least two.

7. The method of claim 1, wherein communicating the handshake signals between the camera core and the downstream processing engine includes communicating handshake signals indicating a data availability.

8. The method of claim 1, wherein communicating the handshake signals between the camera core and the downstream processing engine is based at least in part on preventing an overflow in a buffer in the camera core.

9. The method of claim 8, wherein communicating the handshake signals between the camera core and the downstream processing engine is based at least in part on preventing an overflow in a buffer in the local memory.

10. The method of claim 1, wherein receiving the image at the camera core comprises:
generating the image at an optical sensor;
dividing the image into N image blocks, wherein N is at least two;
transferring the N image blocks sequentially to the camera core; and
concurrently storing a number of the N image blocks in the camera core.

11. The method of claim 10, wherein N is in the range of 2-20.

12. The method of claim 10 wherein the number of the image blocks in the camera core is less than N.

13. The method of claim 1, wherein receiving the image at the camera core comprises:
generating the image at an optical sensor;
dividing the image into a plurality of N image blocks, wherein N is at least two;
transferring the image blocks sequentially from the optical sensor to the camera core; and
concurrently storing a quantity of the N image blocks in the camera core.

14. The method of claim 1, wherein receiving the image at the camera core comprises:
scanning the image N times at an optical sensor to generate N scans, wherein N is at least two;
transferring, for each of the N scans, at least one image block of the image to the camera core; and
concurrently storing a quantity of the N image blocks in the camera core.

15. The method of claim 1, wherein sending the image from the camera core to the local memory includes storing at least a portion of the image in a latency buffer associated with the local memory, wherein the method further comprises
detecting a fill state of the latency buffer associated with the local memory;
and generating the handshaking signal based, at least in part, on the detected fill state.

16. A method of transferring an image to a processing engine, comprising:
scanning an optical sensor to obtain one scan of the image;
extracting an image block of a given N-block division of the one scan of the image, wherein N is at least two;
storing the extracted image block in a camera core;
transferring the extracted image block from the camera core, over a local interconnect to a local memory connected to the local interconnect;
transferring the extracted image block from the local memory, over the local interconnect, to a downstream processing engine connected to the local interconnect; and
repeating, N times, the scanning, the extracting, the storing, and the transferring to provide the image to the downstream processing engine,
wherein the transferring the extracted image block from the local memory to the downstream processing engine includes communicating a handshaking signal directly between the camera core and the downstream processing engine, over a direct handshaking path outside of the local interconnect and coupled to the camera core and to the downstream processing engine.

17. The method of claim 16, wherein transferring the extracted image from the camera core to the local memory includes storing at least a portion of the image in a latency buffer associated with the local memory, wherein the method further comprises
detecting a fill state of the latency buffer associated with the local memory;
and generating the handshaking signal for communicating to the downstream processing engine based, at least in part, on the detected fill state.

18. A method of transferring an image to a processing engine, comprising:
scanning an optical sensor to obtain one scan of the image;
extracting an image block of a given N-block division of the one scan of the image;
storing the extracted image block in at least one of a camera core or a local memory associated with the camera core;
transferring the extracted image block from at least one of the camera core or the local memory, to a downstream processing engine; and
repeating, N times, the scanning, the extracting, the storing, and the transferring to provide the image to the downstream processing engine,
wherein the image is a video frame, and wherein the method further comprises providing a sequence of the video frames to the processing engine by the scanning being at a scan rate of N times FS and, for each of the video frames, performing the repeating N times of the scanning, the extracting, the storing, and the transferring, at rate to provide the sequence of the video frames at a frame rate of FS.

19. An image processor, comprising:
a local data interconnect;
a camera core coupled to the local data interconnect;
a downstream processor coupled to the local data interconnect;
a local memory coupled to the data interconnect; and
a direct handshaking path coupled to the camera core and to the downstream processor,
wherein the camera core is configured to
receive a video frame,
transfer the video frame, over the local data interconnect to the local memory,
and to control transfer of the video frame from the local memory to the downstream processor by block transfers over the local data interconnect and to control the block transfers by communicating handshaking signals with the downstream processor over the direct handshaking path.

20. The image processor of claim 19, wherein the camera core is configured to receive the video frame as a succession of N scan frames, wherein N is at least two.

21. The image processor of claim 20, wherein the camera core is configured to extract from each of the N scan frames a corresponding one of the N pixel blocks.

22. The image processor of claim 19, wherein the downstream processor is any from among a video coder/decoder (VCODEC), a graphics processing unit (GPU) or a display.

23. The image processor of claim 19, wherein the camera core includes a buffer to store at least a portion of the video frame, wherein the camera core is configured to detect a fill level of the buffer and to control the block transfers to the downstream processor based at least in part on the detected fill level.

24. The image processor of claim 23, wherein the camera core is configured to control the block transfers by generating at least a portion of said direct handshake signals based, at least in part, on the detected fill level.

25. The image processor of claim 23, wherein the camera core is further configured to control of the block transfers based on the detected fill level to prevent an overflow of the buffer.

26. The image processor of claim 19, wherein the image processor is integrated in at least one semiconductor die.

27. The image processor of claim 19, further comprising a device, selected from a group consisting of a set top box, music player, video player, entertainment unit, navigation device, communications device, personal digital assistant (PDA), fixed location data unit, and a computer, into which the image processor is integrated.

28. The image processor of claim 19, wherein the local memory includes a latency buffer to store at least a portion of the video frame received from the camera core, wherein the camera core is configured to detect a fill level of the buffer and to control the block transfers to the downstream processor based at least in part on the detected fill level.

29. An image processor, comprising:
a local interconnect;
a camera core connected to the local interconnect;
a local memory coupled to the local interconnect;
a direct handshaking path coupled at one end to the camera core, and configured at another end to couple to a downstream processing engine;
means for scanning an optical sensor to obtain one scan of the image,
means for extracting a block of a given N-block division of the one scan of the image, wherein N is at least two;
means for storing an extracted block, resulting from the extracting, in the camera core;
means for transferring the extracted block, through the local interconnect, from the camera core to the local memory; and
means for transferring the extracted block from the local memory, through the local interconnect, to the downstream processing engine, wherein means for transferring the extracted block from the local memory to the downstream processing engine is configured to control the transferring by communicating handshaking signals over the direct handshaking path between the camera core and the downstream processing engine.

30. The image processor of claim 29, wherein the image processor is integrated in at least one semiconductor die.

31. The image processor of claim 29, further comprising a device, selected from a group consisting of a set top box, music player, video player, entertainment unit, navigation device, communications device, personal digital assistant (PDA), fixed location data unit, and a computer, into which the image processor is integrated.

32. A computer program product, having a computer-readable medium comprising:
code for causing at least one computer to receive at a camera core an image; and
code for causing at least one computer to transfer the image on a block basis, to a downstream processing engine, and to communicate, in association with the transfer on a block basis, a handshaking signal between the camera core and the downstream processing engine, over a direct handshaking path coupled to the camera core and to the downstream processing engine,
wherein the code for causing at least one computer to transfer the image on a block basis causes the at least one computer to transfer the image to a local memory over a local interconnect coupled to the camera core and coupled to the local memory and to the downstream processing engine, and to transfer the image from the local memory to the downstream processing engine over the local interconnect,
wherein transfer of the image blocks from the local memory to the downstream processing engine includes communicating direct handshake signals between the camera core and the downstream processing engine over said direct handshaking path coupled to the camera core and to the downstream processing engine,
wherein communicating the direct handshake signals between the camera core and the downstream processing engine is based on preventing an overflow in a buffer associated with the camera core.

33. The computer program product of claim 32, wherein the code for causing at least one computer to receive the image comprises:
code for causing at least one computer to scan the image N times at an optical sensor to generate N scans, wherein N is at least two;
code for causing at least one computer to transfer, for each of the N scans, at least one block of the image to at least one of the camera core and a local memory associated with the camera core; and
code for causing at least one computer to concurrently store a quantity of N of the blocks of the image in at least one of the camera core and the local memory.

34. A computer program product, having a computer-readable medium comprising:
code for causing at least one computer to scan an optical sensor to obtain one scan of an image;
code for causing at least one computer to extract an image block of the one scan of the image, according to a given N-block division, wherein N is at least two;
code for causing at least one computer to store the extracted image block in a camera core;
code for causing at least one computer to transfer the extracted image block from the camera core, over a local interconnect, to a local memory connected to the local interconnect;
code for causing at least one computer to transfer the extracted image block from the local memory, over the local interconnect, to a downstream processing engine connected to the local interconnect; and
code for causing at least one computer to repeat the scan, extract, store, and transfer N times to provide the image to the downstream processing engine,
wherein the code for causing at least one computer to transfer the extracted image block from the local memory to the downstream processing engine includes code for causing at least one computer to communicate a handshaking signal directly between the camera core and the downstream processing engine, over a direct handshaking path outside of the local interconnect and coupled to the camera core and the downstream processing engine.

35. A method of image processing, comprising:
   step of receiving an image at a camera core; and
   step of transferring the image on a block basis from the camera core to a downstream processing engine, wherein the transferring includes
      communicating a handshaking signal between the camera core and the downstream processing engine over a direct handshaking path coupled to the camera core and to the downstream processing engine and, in association with the communicating a handshaking signal, sending the image from the camera core over a local interconnect to a local memory, and
      transferring the image from the local memory, over the local interconnect, to the downstream processing engine.

36. A method of transferring an image to a processing engine, comprising:
   step of scanning an optical sensor to obtain one scan of the image,
   step of extracting an image block of the one scan of the image according to a given N-block division of the one scan;
   step of storing the extracted image block in a camera core;
   step of transferring the extracted image block from the camera core, over a local interconnect to a local memory connected to the local interconnect;
   step of transferring the extracted image block from the local memory, over the local interconnect, to a downstream processing engine; and
   repeating, N times, wherein N is at least two, the step of scanning, the step of extracting, the step of storing, and the step of transferring to provide the image to the downstream processing engine,
   wherein the step of transferring the extracted image block from the local memory to the downstream processing engine includes communicating a handshaking signal over a direct handshaking path coupled directly between the camera core and the downstream processing engine.

37. A method of processing an image, comprising:
   receiving the image at a camera core; and
   transferring the image on a block basis from the camera core to a downstream processing engine, over a local interconnect coupled to the camera core and to the downstream processing engine,
   wherein the transferring includes communicating a handshaking signal between the camera core and the downstream processing engine, over a direct handshaking path between the camera core and the downstream processing engine,
   wherein receiving the image at the camera core comprises:
      generating the image at an optical sensor;
      dividing the image into N image blocks, wherein N is at least two;
      transferring the N image blocks sequentially to the camera core; and
      concurrently storing a number of the N image blocks in the camera core, and
      wherein the number of the image blocks in the camera core is less than N.

38. An image processor, comprising:
   a camera core;
   a downstream processor coupled over a data interconnect to the camera core; and
   a direct handshaking path coupled to the camera core and to the downstream processor,
      wherein the camera core is configured to
   receive a video frame,
   and to transfer the video frame by N block transfers over the data interconnect to the downstream processor, each of the block transfers transferring a corresponding one of N pixel blocks of the video frame, and to control the N block transfers over the direct handshaking path,
   wherein the camera core includes a buffer to store at least a portion of the video frame, and
   wherein the camera core is configured to detect a fill level of the buffer and to control the block transfers to the downstream processor based at least in part on the detected fill level.

39. The image processor of claim 38, wherein said direct handshake signals are based, at least in part, on the detected fill level.

40. The image processor of claim 38, wherein said control of the block transfers based on the detected fill level controls the block transfers to prevent an overflow of the buffer.

41. The image processor of claim 38, wherein the image processor is integrated in at least one semiconductor die.

42. The image processor of claim 38, further comprising a device, selected from a group consisting of a set top box, music player, video player, entertainment unit, navigation device, communications device, personal digital assistant (PDA), fixed location data unit, and a computer, into which the image processor is integrated.

43. The image processor of claim 38, wherein N is at least two.

* * * * *